July 29, 1969     A. W. JASEK     3,457,768
METER PROVING
Filed Feb. 7, 1966
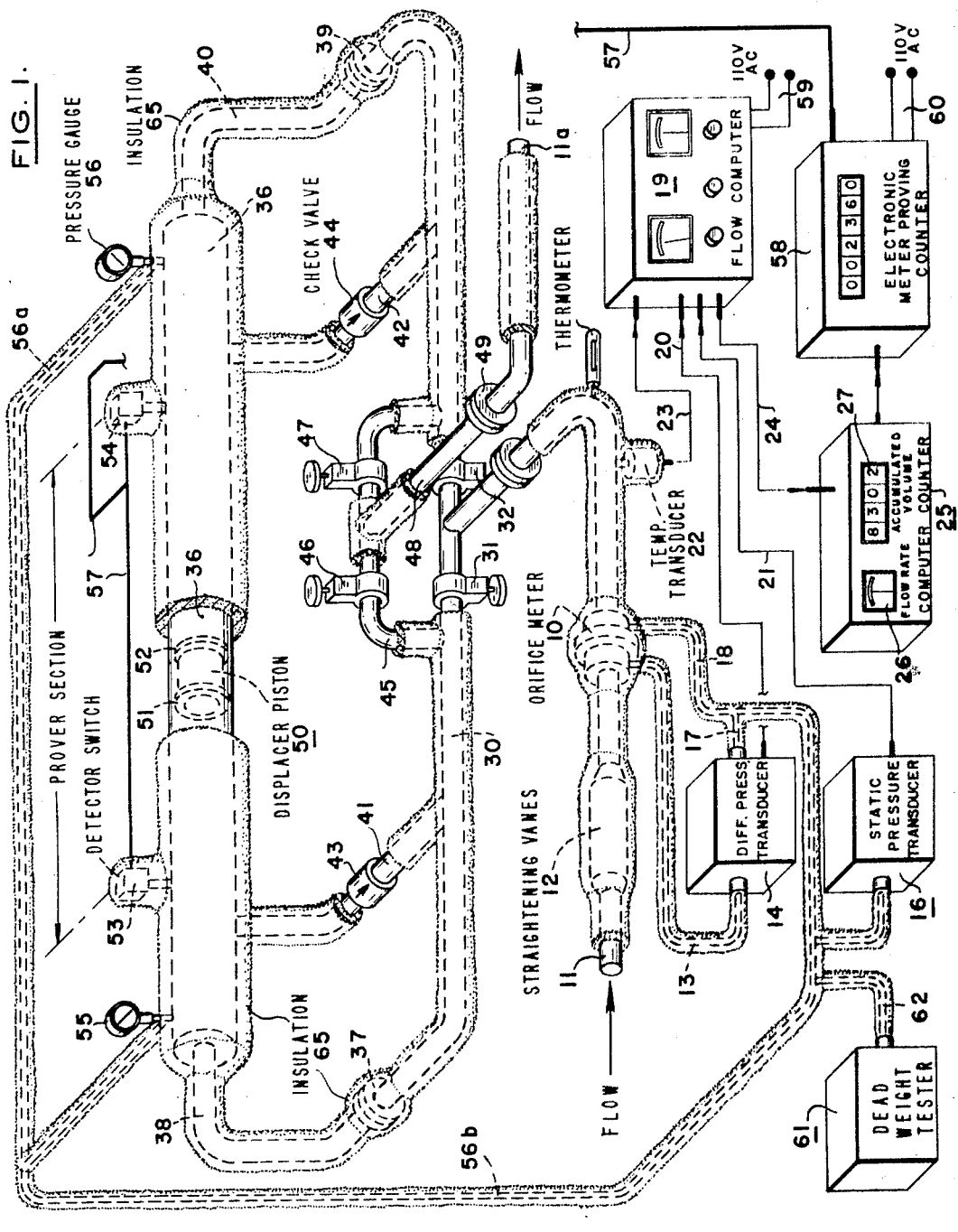
*INVENTOR.*
ALBERT W. JASEK,
BY
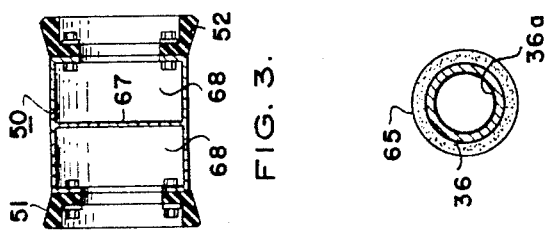
ATTORNEY.

United States Patent Office 3,457,768
Patented July 29, 1969

3,457,768
METER PROVING
Albert W. Jasek, Houston, Tex., assignor to Esso Research and Engineering Company
Continuation-in-part of application Ser. No. 506,026, Nov. 2, 1965. This application Feb. 7, 1966, Ser. No. 525,638
Int. Cl. G01f 25/00
U.S. Cl. 73—3                              12 Claims

ABSTRACT OF THE DISCLOSURE

A gas meter in a pipeline is calibrated by flowing gas continuously through a meter located in said pipeline and then through a calibration zone of known volume to obtain a first signal from a meter which is a function of the rate of flow and converting the first signal to a second signal which is a function of a preselected incremental volume. The second signal is a function of the volume of gas flowing through the meter and the resulting record is converted to a third signal. A fourth signal obtained from the calibration zone is a function of the known volume and the third and fourth signals are displaced whereby the volume of gas flowing through the meter is compared with the known volume flowed through the calibration zone.

---

This application is a continuation in part of Ser. No. 506,026, now abandoned, entitled, "Meter Proving," filed Nov. 2, 1965, for Albert W. Jasek.

The present invention is directed to proving and calibrating meters. More particularly, the invention is concerned with proving and calibrating an orifice meter employed in measuring gas flow through a pipeline. In its more specific aspects, the invention is concerned with automatically proving and calibrating orifice meters in a gas pipeline employing a flow computer and electronic counters.

The present invention may be briefly described as means for calibrating a meter, such as an orifice meter, in a gas pipeline in which a flow computer is employed for determining flow rate and volume of gas flowing in the pipeline. The invention involves, in combination with the meter and flow computer, a calibration conduit provided with reversible means for fluidly connecting the calibration conduit into the pipeline for selective reversible monodirectional flow of gas through the calibration conduit. Means is also provided in the calibration conduit adapted to be propelled in either direction by gas flowing in the calibration conduit. Spaced control means in the calibration conduit initiate and terminate a calibration operation in the calibration conduit and means connected to the calibration conduit and to the computer compare the known volume of the calibration conduit with the volume of gas passing through the meter during a selected period of time.

The calibration means of the present invention includes with the computer differential and static pressure transducers and temperature transducers for introducing these factors into the computer. The calibration means also includes the computer provided with volume and flow rate recording means and signal means. Likewise, in accordance with the present invention, while it is preferred to employ a differential pressure meter such as an orifice meter, the meter may be any type of meter such as, but not limited to, positive displacement, turbine, Venturi, mass flow, flow nozzle, and well choke meters.

The means reversibly propelled in the calibration conduit is suitably a piston member provided with a cup on each end for sealing engagement with the internal wall of the calibration conduit.

In accordance with the present invention, gas meters, such as orifice meters, are calibrated by flowing gas continuously in a pipeline and thence through a calibration zone of known volume. The flow through the orifice meter is continuous and through the calibration zone is reversible.

A first signal is obtained from a meter which is a function of the rate of flow through the meter. This signal is converted to a second signal which is a funtion of a preselected incremental volume. The second signal is recorded over a selected period of time as accumulated volume of gas flowing through the meter and the resulting record is converted to a third signal. Reversible flow through the calibration zone provides a fourth signal which is a function of the known volume of the calibration zone. The third and fourth signals are then compared electronically whereby the accumulated volume of gas flowing through the meter is compared with the known volume of gas flowed through the calibration zone and thereby the meter is calibrated by obtaining a flow factor for the meter.

The present invention is quite important and useful in that heretofore gas meters, such as orifice meters, were not subject to accurate calibrations especially under continuous flow conditions where flow conditions may range from steady to variable. The present invention provides a method and apparatus for proving and calibrating an orifice meter used with a computer or any other meter device which is used in measuring gas or other fluids including liquids such as used in the petroleum and other industries where precise measurements are important. The method for calibrating and proving a meter measuring gas under actual operating conditions of flow rate and pressure may calibrate the meter within an accuracy of about 0.01% by volume.

The present invention will be further illustrated by reference to the drawing in which:

FIG. 1 is a preferred mode and embodiment;
FIG. 2 is a cross-sectional view of the embodiment of FIG. 1; and
FIG. 3 is a cross-sectional view showing the detail of the piston of FIG. 1.

Referring now to the drawing and particularly to FIG. 1 and FIG. 2, numeral 11 designates a pipeline optionally provided with straightening vanes contained in a housing 12 through which gas is flowing in a direction indicated by the arrow. The pipeline 11 has an orifice meter 10 of a well known type arranged therein. The upstream side of the orifice meter has a conduit 13 leading therefrom into a differential pressure transducer 14. The downstream side of orifice meter 10 is connected in to the static pressure transducer 16 by line 18 and to the differential pressure transducer by branch line 17. Differential pressure transducer 14 is connected to the downstream side of orifice meter 10 by branch line 18. An impulse from pressure transducer 14 is introduced into a flow computer 19 by electrical lead 20. Likewise, an impulse from static transducer 16 is introduced into flow computer 19 by lead 21. The downstream side of pipeline 11 has a temperature transducer 22 connected thereto which is connected with computer 19 by lead 23 which provides a signal to the computer 19. The flow rate signal from the orifice meter 10 which results from the impulses from the pressure transducers and the signal from the temperature transducer are fed to the flow computer 19. These signals are electronically combined into a second signal which is a function of the rate of flow through the meter and this signal is directed by lead 24 into a computer counter 25 where it is recorded over a selected period of time as accumulated volume of gas flowing through the meter and is converted to a third signal. It is to be noted that the counter 25 not only indicates accumulated volume, but also displays the flow rate on a separate indicating means 26. Indicating means 27 shows accumulated volume.

The flow through pipeline 11 leads into a manifold 30 provided with valves 31 and 32. Manifold 30 connects to the ends of a calibration conduit 36 by means of flange 37, connecting line 38 and flange 39 connecting into line 40. Leading from the manifold 30 are branch lines 41 and 42 provided respectively with check valves 43 and 44 which allow flow back into the manifold 30, but which resist flow into the calibration conduit 36. A bypass line 45 is provided with valves 46 and 47. Bypass line 45 communicates by branch line 48 to pipeline 11A (a continuation of line 11) and is connected thereto by flange 49.

The calibration conduit 36 has arranged therein a displacer piston 50 which is suitably provided with cups 51 and 52 on each end. The piston 50 is suitably constructed of a lightweight material, such as aluminum or the like, and is adapted to be moved reversibly in the conduit 36 with less than 0.25 p.s.i.g. without losing a seal. It is desirable that the internal wall of the calibration conduit 36 be defined by a seamless pipe which has been bored or honed to remove grooves and irregularities. Wall thickness must be sufficient so that the calibration conduit 36 is not subject to deformation with resulting change in volume. For example, in a system using high pressure, wall thickness should not be less than 0.438″, depending, of course, on pipe size. The skilled workman may select the proper wall thickness for safe working pressure. The internal wall of calibration conduit 36 may suitably be coated with a suitable film lubricant, such as a coating 36A of a dry film lubricant, which does not cause the cups 51 and 52 to swell. In other words, the lubricant and the material making up the cups 51 and 52 must be carefully selected. Suitable lubricants given by way of illustration and not by way of limitation are: Teflon, molybdenum disulfide, and graphite. Other dry film lubricants may be used. Suitable materials for cups 51 and 52 are: Teflon or LPG nonswell rubber scraper cups coated with the above dry film lubricants.

Spaced adjacent each end of the calibration conduit 36 are switches 53 and 54. Likewise, adjacent each end of the calibration conduit 36 are pressurge gauges 55 and 56. Pressure gauges 55 and 56 may be connected by conduits 56A and 56B to a dead-weight tester 61, which may be used to calibrate gauges 55 and 56 or to replace them. Also tester 61 may be used to calibrate static pressure transducer 16 and to this end is connected thereto by line 62. Movement of the piston 50 to the right causes the switch 54 to be actuated which feeds a signal through the leads 57 into an electronic meter proving counter 58 while reversible movement to the left actuates switch 53, which causes a signal to be fed by leads 57 into counter 58. Transfer of the piston 50 to the right and back to the left completes a cycle for testing the meter 10. Power input is fed into the flow computer 19 through electrical leads 59 which connect to 110 v. AC while power is fed into the proving counters 58 through electrical leads 60 connecting to 110 v. AC.

The conduit 36, manifold 30, pipeline 11 and all conduits, valves, and the like through which gas is flowed are provided with suitable insulation 65 which suitably may be about one inch or more of polyurethane foam, and the like. Other insulation means such as cork, fiber glass and the like may be used. For example, other foamed polymers or resins may be employed besides polyurethane.

Referring now to FIG. 3, the displacer piston 51 is provided with opposed circular cups 51 and 52 on each end thereof. Cups 51 and 52 are formed from flexible deformable material which is not attacked by the gas flowed through conduit 36. The cups 51 and 52 make sealing contact with the wall of conduit 36, on which coating 36A is deposited, with minimum pressure drop across the piston 50 and minimum wear on the cups 51 and 52.

The piston 50 is suitably constructed of a lightweight metal such as, but not limited to, aluminum, magnesium, alloys thereof, and the like. Piston 50 is provided with a partition member 67 which forms chambers or recesses 68 open to the interior of conduit 36. These chambers 68 serve to provide buoyancy to the piston 50 which allows it to move easily and freely and thus pressure drop across the piston 50 and wear on cups 51 and 52 is reduced and minimized.

The provision of coating 36A, lightweight piston 50 having buoyancy, and reducing and minimizing pressure drop across the piston 50 and wear on cups 51 and 52 all cooperate to allow the benefits of the present invention to be achieved. Likewise, external insulation of the conduits, valves, etc. through which gas is flowed reduces temperature changes from about 10° F. differential without insulation to about 1° F. differential with insulation which increases the accuracy of the operation to a great degree.

In accordance with the present invention, flow may be directed into the calibration conduit in either direction, as indicated by the arrows, to complete a testing cycle. Thus, in accordance with the present invention, the invention allows measurement of the rate of flow and registers the accumulated volume of fluid passing through an orifice plate under conditions ranging from steady to variable flow rates. By means of a transducer, the differential pressure created by fluid passing through the orifice plate is transmitted by an electrical signal to the computer which handles the analog signal by extracting the square root which results in a signal representing flow rate. The flow rate signal is supplied to a magnetic integrator which gives an electrical pulse for a preselected increment of volume. This pulse is then used to operate a counter to give a visual indication of the accumulated volume.

$$Q_b = C' F_{tf} \sqrt{hwP_f}$$

$Q_b$ = quantity rate of flow at atmospheric conditions cubic feet/hour
$F_{tf}$ = flowing temperature compensation factor
$hw$ = differential pressure in inches of water
$P_f$ = static pressure, supplied by a transducer for line conditions
$C'$ = an "orifice flow factor" which includes a number of constants and can be calculated by the following equation and then dialed into the computer manually $$C' = F_b \times Fr \times Y \times F_{pb} \times Fg \times F_{pv} \times Fm \times F_{tb}$$

in which $F_b$ = basic orifice factor
$F_r$ = Reynolds number factor
$Y$ = expansion factor
$F_{pb}$ = pressure base factor
$F_{tb}$ = temperature base factor
$F_{tf}$ = flowing temperature factor
$F_g$ = specific gravity factor
$F_{pv}$ = supercompressibility factor
$Fm$ = manometer factor Each of the above individual factors is determinable and the resulting calculated value of $C'$ is fed into the computer to provide a direct readout of the accumulated volume in the desired units.

The values of $F_{tf}$, $hw$ and $P_f$ are supplied as electrical signals to the computer for existing pipeline conditions. The value of $C'$ is a value or factor not normally determinable under operating conditions and therefore ordinarily introduces an uncertainty in gas measurement. In accordance with the present invention, $C'$ is determinable under operating conditions and therefore removes the uncertainty in gas measurement. This is obtained as shown in the description taken in conjunction with the drawing and has been employed to determine the value of $C'$ under operating conditions without interrupting normal flow conditions. In this method, the value of $F_{tf}\sqrt{hwP_f}$ is displayed on the computer as accumulated volume, and Q represents the prover volume between the detector switches. During a proving run, an electronic counter or proving counter connected to the computer duplicates volume registered on the computer when the gas stream is directed into the calibration conduit when the displacer piston contacts switches 53 and 54 in either direction. Then by solving the equation $Q=C'F_{tf}\sqrt{hwP_f}$, the value of $C'$ is determined under actual operating conditions and therefore removes uncertainty in the measurement because a flow factor has been obtained which allows the orifice meter 10 to be calibrated.

The accuracy of calibrating or proving the meters may be increased by increasing the number of pulses generated per unit volume passing through meter 10. Depending on the volume of the calibration conduit and the flow rates, the number of pulses generated per unit volume may be increased so that accuracy of 0.01% by volume is attained in determining the value of $C'$. Computer resolution of the number of pulses generated may be increased by any number of methods common to the electronics industry. One practical way of increasing pulses generated per unit volume is by the use of frequency multipliers in the computer circuit.

The flow computer employed in the present invention is suitably a flow computer such as Model 257 which is made available to the trade by Computers Division of Camco, Inc., 5123 Glenmont Drive, Houston, Tex. Such a flow measurement system has been described by that organization in a brochure entitled "Flow Measurement System." A flow computer also made available to the trade by the Electronic Division of Daniel Orifice Fitting Company of Houston, Tex., and described in its brochure entitled "The Daniel Series 1200 Flow Computers" may also be used.

The several transducers and counters referred to are available on the market.

The nature and objects of the present invention having been completely described and illustrated, and the best mode and embodiment contemplated set forth, what I wish to claim as new and useful and secure by Letters Patent is:

1. A method for calibrating a meter which comprises:
   flowing gas continuously through a meter provided with pressure transducers located in a pipeline and thence past a temperature transducer and then through a calibration zone of known volume;
   electronically obtaining a signal from said temperature transducer;
   electronically obtaining a first signal from said meter resulting from impulses from said pressure transducers which is a function of the rate of flow through said meter;
   electronically combining said first signal and the temperature signal to produce a second signal proportional to the rate of flow through said meter;
   electronically accumulating said second signal to give the total volume of gas flowing through said meter over a selected period of time and electronically producing a third signal which is proportional to this accumulated volume;
   electronically obtaining a fourth signal from said calibration zone which is proportional to the volume of gas flowing through said calibration zone in said preselected period of time; said recorded volume signal being substantially duplicated by said fourth signal;
   electronically comparing said third and fourth signals to obtain a flow factor for said meter;
   whereby the volume of gas flowing through said meter is determinable by applying said flow factor to said metered flow volume.

2. A method in accordance with claim 1 in which normal flow conditions through said pipeline are maintained while said gas is flowed continuously through said meter and through said calibration zone.

3. A method in accordance with claim 1 in which said gas is reversibly flowed through said calibration zone.

4. A method in accordance with claim 1 in which the first signal is amplified by increasing it relative to the rate of flow through said meter.

5. In combination with a meter in a gas pipeline having a flow computer, means for calibrating said meter comprising:
   a calibration conduit;
   reversible means for fluidly connecting said calibration conduit into said pipeline for selective reversible monodirectional flow of gas through said calibration conduit;
   means in said calibration conduit adapted to be propelled in either direction in said calibration conduit by gas flowing in said calibration conduit;
   spaced control means in said calibration conduit for initiating and terminating a calibration operation in said calibration conduit; and
   means connected to said calibration conduit and to said computer for displaying the volume measured by said meter during the passage of said propelled means between said spaced control means;
   said computer being provided with:
   (1) a differential pressure transducer operatively connected thereto and to said pipeline on the upstream and downstream side of said meter;
   (2) a static pressure transducer operatively connected thereto and to said pipeline on the downstream side of said meter; said differential and static pressure transducers being interconnected and producing signals respectively, proportional to the volume of gas flowing through said meter and to the gas pressure within said pipeline; and
   (3) a temperature transducer operatively connected thereto and to said pipeline on the downstream side of said meter for producing a signal proportional to the temperature of the gas within said pipeline.

6. Calibration means in accordance with claim 5 in which said computer is provided with volume and flow rate displaying means.

7. Calibration means in accordance with claim 5 in which the meter is an orifice meter and said propelled means is a piston member provided with a cup on each end for sealing engagement with the internal wall of said calibration conduit.

8. Apparatus for calibrating a gas flow meter in a pipeline which comprises:
   a calibration barrel having a substantially uniform inside diameter;
   conduit means for connecting said barrel in series with said flow meter;
   a movable piston in said barrel provided with circular flexible means on each end of said piston sealing off flow between the inner wall of said barrel and said piston;
   said piston being formed for equalizing wear about the periphery of said flexible means;
   switch means disposed at each end of said barrel responsive to passage of said piston thereby;
   means for producing a signal proportional to the gas pressure within said conduit means;
   means for producing a signal proportional to the temperature of the gas within said conduit means; and
   means for maintaining the gas flowing through said calibration barrel and conduit means at a substantially uniform temperature substantially equal to the temperature of the gas flowing through said meter.

9. Apparatus for calibrating a gas flow meter in a pipeline which comprises:
   a calibration barrel having a substantially uniform inside diameter;
   conduit means for connecting said barrel in series with said flow meter;

a movable piston in said barrel provided with circular flexible means on each end of said piston sealing off flow between the inner wall of said barrel and said piston;

said piston being formed for equalizing wear about the periphery of said flexible means;

lubricating means coating the inner wall of said barrel and said flexible means for reducing frictional resistance between said piston and barrel;

switch means disposed at each end of said barrel responsive to passage of said piston thereby;

means for producing a signal proportional to the gas pressure within said conduit means;

means for producing a signal proportional to the temperature of the gas within said conduit means; and means for maintaining the gas flowing through said calibration barrel and conduit means at a substantially uniform temperature substantially equal to the temperature of the gas flowing through said meter.

10. Apparatus in accordance with claim 9 in which:
the calibration barrel is disposed in a horizontal and level relation;
the flexible means is circular;
the lubricating means is a dry film; and
said piston is formed of a lightweight material.

11. Apparatus in accordance with claim 9 in which said piston is buoyant.

12. Apparatus in accordance with claim 9 in which the gas pressure signal means is a static pressure transducer and the temperature signal means is a temperature transducer.

References Cited

UNITED STATES PATENTS

| | | | |
|---|---|---|---|
| 3,021,703 | 2/1962 | Pfrehm | 73—3 |
| 3,120,118 | 2/1964 | Boyle | 73—3 |
| 3,138,013 | 6/1964 | Smith | 73—3 |
| 3,254,523 | 6/1966 | Fisher et al. | 73—3 |
| 3,271,994 | 9/1966 | Fournier et al. | 73—3 |
| 3,273,375 | 9/1966 | Howe | 73—3 |

LOUIS R. PRINCE, Primary Examiner

H. C. POST III, Assistant Examiner